Jan. 21, 1964

O. G. FULFORD 3,118,316

SPROCKET WHEELS

Filed Jan. 2, 1962

INVENTOR
Oliver G. Fulford

BY
Stevens, Davis, Miller & Mosher
ATTORNEYS

Jan. 21, 1964　　　O. G. FULFORD　　　3,118,316
SPROCKET WHEELS

Filed Jan. 2, 1962　　　　　　　　　　2 Sheets-Sheet 2

INVENTOR
Oliver G. Fulford

BY Stevens, Davis, Miller & Mosher
ATTORNEYS

3,118,316
SPROCKET WHEELS
Oliver G. Fulford, 917 Fulford Road, Ocala, Fla.
Filed Jan. 2, 1962, Ser. No. 163,689
1 Claim. (Cl. 74—243)

The invention described herein may be readily understood in relation to use of the sprocket wheel in connection with chain saws. In chain saws, a sprocket wheel is mounted upon a drive shaft and drives an endless chain carrying saw teeth. In the course of using chain saws, it is found that the sprocket wheel must be very carefully related to the chain saw itself in the sense that it is composed of metals which do not effect great wear upon the segments of the chain linkage. Rapid wear of the chain link leads to early discarding of the chain of the sprocket wheel at great expense. Accordingly, usually the teeth of the sprocket wheel are of a softer metal than the chain segments and in consequence they are rapidly worn by engagement with the chain saw, and it is necessary that the sprocket wheels be replaced at very frequent intervals. This in itself is costly, although not nearly as costly as the chain saws, and it is desirable that means be provided to reduce the cost of the sprocket wheels since a large number of them are used over the life of the piece of equipment. Prior to this invention, it is not believed that this problem has been satisfactorily solved.

According to this invention, a sprocket wheel is provided of the conventional type which is adapted to accommodate wear-covers on the surfaces of the teeth, thus, providing a new surface for engagement with the chain segments whereby the wear which would otherwise be taken by the sprocket wheel is taken by the wear-covers. When the coverings for the teeth of the sprocket wheel have themselves become worn to a point where the proper engagement is not being made with the chain segments, the wear-covers may be easily removed and simply replaced by a new set.

In one embodiment of the invention, hereinafter to be more fully described, each tooth of the sprocket wheel is provided with its separate wear-cover. Thus, in an eight-tooth sprocket wheel, for example, eight wear-covers would be necessary. In another embodiment of the invention, also hereinafter more fully described, a single unit is so shaped as to cover all of the teeth of the sprocket wheel. As will be understood, this latter embodiment is of one piece construction. Each of these embodiments will be described.

In connection with the first embodiment, a sprocket wheel of the conventional type is provided having each of the individual teeth modified to provide slots which extend generally inwardly of the base line of the teeth, the slots being for the purpose of accommodating co-operating flange portions on each of the wear-covers.

There is a plurality of slots between each of the teeth, namely two slots extending generally oppositely, each of the slots accommodating adjoining wear-covers. The slots, teeth, and wear-covers are so related that when the covers are in place upon the teeth, they abut each other adjacent the pre-formed flange portions of the wear-covers at or near their lower extremities. It has been found that by providing the wear-cover in this fashion, i.e., with the pre-formed portions locking into the teeth and each wear-cover firmly abutting wear-covers adjacently positioned, they are retained by the sprocket wheel firmly in their proper position and in normal use of chain saws they cannot be dislodged and thrown from the sprocket wheel. This is an important accomplishment inasmuch as it is quite obviously dangerous to provide a tool, the parts of which cannot be relied upon to stay firmly positioned, dangerous in that pieces thus thrown may do serious injury to the operator and also may damage the chain saw itself.

In the second form of the invention, the unitary wear-cover, heretofore mentioned generally, is pre-formed and of flexible material in order that it may be fitted around the entire sprocket wheel and initially locked into position thereon.

The initial locking of the unitary wear-cover is accomplished by providing a pair of slots beneath two adjacent teeth of the sprocket wheel, the slots being formed and positioned similarly as the slots in the first embodiment of the invention. As will be appreciated, in this form of the invention, the teeth are not covered by individual pieces and therefore renewing of the surfaces is accomplished in a somewhat simpler manner. However, in this instance, it is found to be desirable to provide additional means for locking the unitary wear-cover in place upon the sprocket wheel and for this purpose, at least one, and preferably a pair of special co-operating sprocket wheel cover-plates is provided.

As will be understood, normally a sprocket wheel is positioned between two generally similar oppositely positioned circular plates and the assembly is mounted upon the drive shaft of the saw motor. The pieces are provided with shaft bearing surfaces co-operating with the drive shaft so as to be positively driven thereby. The chain saw contacts the sprocket wheel teeth thus driving the chain saw, and the cover plates are of sufficiently larger diameter than the sprocket wheel to provide a channel within which the chain saw travels.

In the second form of the invention, one of the cover plates is provided with lockpins which extend vertically relative to the flat surface of the cover plate, the lockpins being positioned on the plate so that when the sprocket wheel is positioned adjacently with the unitary wear-cover thereon, they register with the area of the wear covers adjacent the bases of the sprocket wheel teeth. Thus, a plurality of the lockpins are strategically positioned upon the cover plate so as to co-operate with the sprocket wheel and provide relatively strong frictional engagement, thereby serving to prevent movement of the unitary cover from its intended position. It will be understood that the sprocket wheel cover plate just referred to rotates with the sprocket wheel and that there is no possibility that the unitary cover can become dislodged from the sprocket wheel. Desirably, an outer cover plate having sockets therein positioned to receive the lockpins carried by the inner plate is provided whereby to reduce any strain which may occur upon the lockpins as the saw is operated.

This form of the invention has several advantages to recommend it. It may be readily stamped to a pre-formed configuration. Because of its unitary construction, it may be manufactured cheaply. It affords an extremely rapid means of renewing the surfaces of the teeth and it positively retains its position under all conditions of use.

It will be appreciated that the foregoing generally described forms of the invention provide substantial improvements over attempts which have been made heretofore to solve problems of the type generally incurred in sprocket wheels which are utilized for driving metallic parts, particularly chain saws, and that it is an object of this invention to provide such apparatus in the forms mentioned.

Before proceeding to describe the invention in more complete detail relative to the drawings which are appended hereto, it is desired to point out that the wear-covers may be formed of any material which is known to be suitable, e.g., stainless steel.

Referring now to the drawings,
FIGURE 1 is a view in front elevation of a sprocket wheel pre-formed and constructed according to this invention, but without the wear-covers of this invention.

Figure 1:
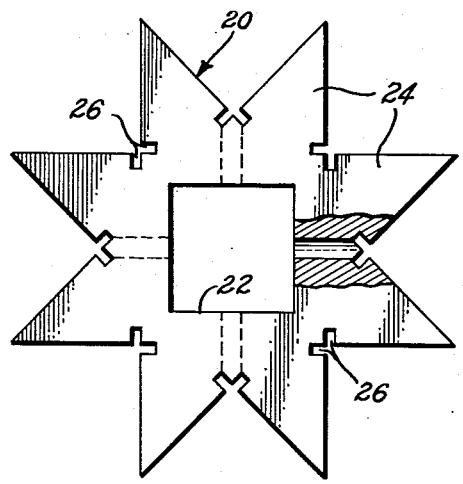

Referring to FIGURE 1 of the drawings, numeral 20 denotes a sprocket wheel pre-formed according to this invention having a central rectangular bearing surface 22 which surface adapts it for co-operation with similarly shaped shaft. Numeral 24 denotes teeth of which there are eight as shown, although the number as will be appreciated is not to any extent critical. Numeral 26 denotes slots extending inwardly of the wheel body and entirely through the thickness of the sprocket wheel to its opposite side. As will be observed, the slots are substantially at right angles to the surfaces from which they extend. It has been found that an angle of 45° provides highly satisfactory locking engagement with the turned down portions of the wear-covers which are to be described in the following paragraphs. However, this function may be accomplished by disposing the slots at a different angle, e.g., any angle of from about 45° and up to about 150° or more provides good locking engagement between the wear-covers and the body of the sprocket wheel. Angles less than 45° tend to give too little purchase on the wheel body whereas angles approaching 180° provide locking surfaces which are quite thin and may break away from the wheel body. The angles referred to may be described as those generated by a line moving clockwise having as the base line a line in the plane of the sloping sides of the teeth and perpendicularly to the apex edge of the teeth.

Figure 2:
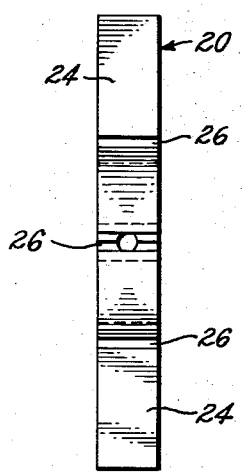
FIGURE 2 is a view in side elevation of the sprocket wheel illustrated in FIGURE 1, which view shows the details of the invention with particular regard to the slots which are formed in the sprocket wheel body.

The relationship of the slots 26 with respect to the body of the sprocket wheel may be more fully observed in FIGURE 2.

Figure 3:
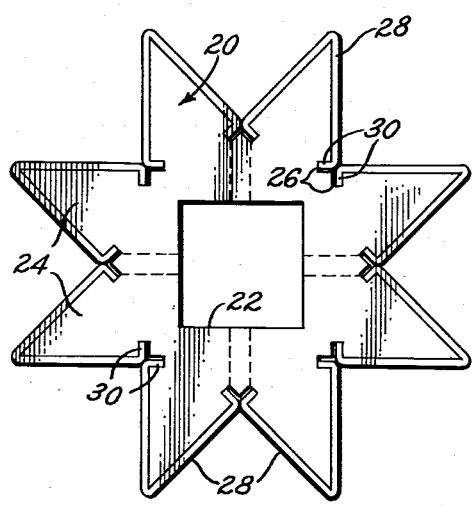
FIGURE 3 is a view in front elevation showing the sprocket wheel of FIGURE 1 having individual wear-covers positioned thereon according to the first embodiment of the invention.

The wear-covers of the invention are shown in position upon the sprocket wheel in FIGURE 3.

Figure 4:
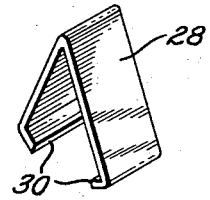
FIGURE 4 is an isometric view of a single wear cover suitable for use as illustrated in FIGURE 3.
Figure 5:
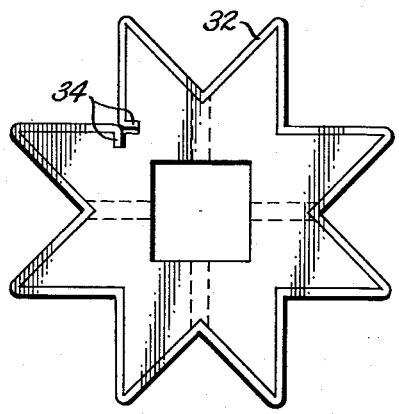
FIGURE 5 is a front view of a pre-formed wear-cover provided according to a second embodiment of the invention in position about a second form of sprocket wheel.

Referring to FIGURE 4 of the drawings, numeral 28 denotes generally the wear covers formed according to this invention. As will be observed upon reference to FIGURE 4 each wear-cover is shaped to conform to the contour of the teeth of the sprocket wheel and to cover the entire driving surface of the teeth. Numeral 30 denotes flanged portions on the wear-covers which extend across the width of the covers and extend from the wear-cover at an angle as heretofore described. As will be understood, the angle of the flange is pre-formed so that it is similar to the angle of the slot in the sprocket wheel.

The slots in the sprocket wheel may be formed initially and supplied at the time the chain saw itself is purchased, the wheel being provided with teeth of appropriate size to function properly with the chain saw. In this case when the teeth have become worn sufficiently to require replacement, sprocket wheel may be removed and the teeth filed to a uniform configuration so as properly to accommodate the wear-covers. Preferably, however, sprocket wheels are supplied with new equipment which have the wear-covers of this invention in position thus providing a ready-formed sprocket wheel to receive additional wear covers without the need for the filing operation as the wear covers require to be replaced.

In use, when the wear covers have become worn, they are simply and easily removed from their position by forcing them axially of the sprocket wheel along the slots until they completely emerge from the locked position. Similarly, new wear covers are slid into position upon the surface of each tooth and the sprocket wheel is then ready for reuse. It is desired to emphasize once again that the locking of the wear-covers into position in the manner taught herein is important and it is also important that the covers abut each other along their width, suitably at or near their base line where the flange is turned inwardly. The abutting relationship serves to prevent the pre-formed wear covers from deforming in the course of their use. Deformation, which may otherwise occur, leads to looseness of the wear-covers and the danger that they may be thrown from the sprocket wheel.

Referring now to a further embodiment of this invention as generally described hereinabove, and with particular reference to FIGURES 5–8 of the drawings, numeral 32 denotes a pre-formed unitary wear-cover adapted to conform to the configuration of the teeth of a sprocket wheel. As will be seen, the unitary wear-cover may be described as composed of a plurality of wear-covers joined together at their bases so that it is only necessary to fit the cover around the sprocket wheel and lock it in position as will be described presently. In practice it is formed as one piece. Numeral 34 denotes flange portions on the unitary structure adapting it for co-operation with a pre-formed suitably slotted sprocket wheel. As described generally previously, this form of the invention is co-operatively associated with specially designed cover plates which may be observed in FIGURES 6 and 8 and which are denoted by numerals 36 and 38 respectively. On the inside face plate, i.e., numeral 36 and extending horizontally therefrom is a plurality of locking pins which pins are denoted by numeral 40.

Figure 7:
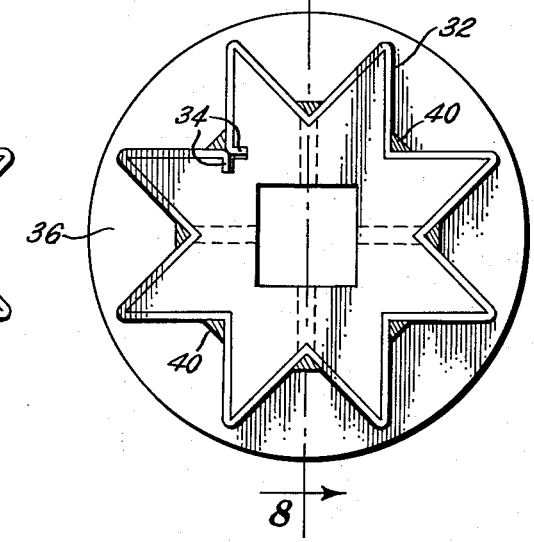
FIGURE 7 is a view in front elevation partly in section showing the assembly of FIGURE 5 positioned relatively to the lockpins of the cover plate.
Figure 6:
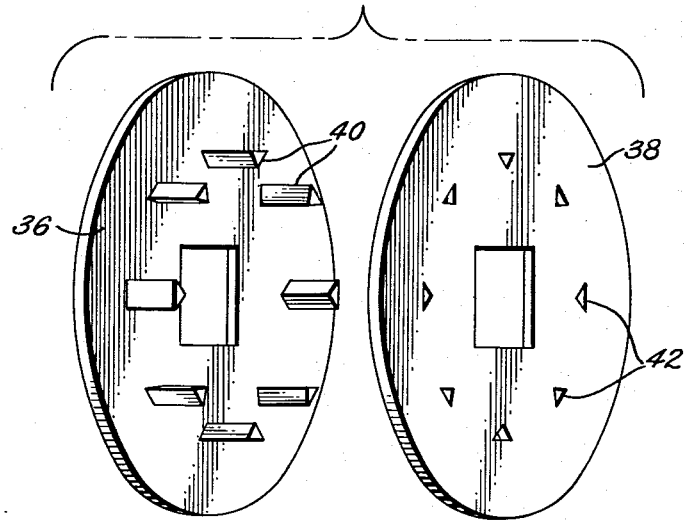
FIGURE 6 is an isometric view of a pair of sprocket wheel cover plates provided according to this invention, one showing the lockpins and the other co-operating sockets therefor.
Figure 8:
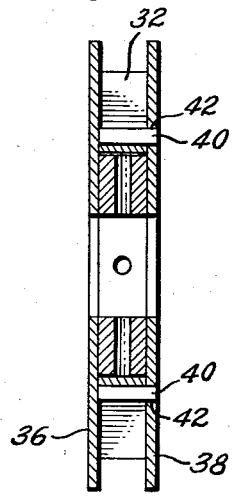
FIGURE 8 is a sectional view of FIGURE 7 on the line 8—8 but showing also both cover plates in position.

As will be seen, the locking pins are generally triangular in shape for the purpose of adapting their easy and effective engagement between the teeth of the sprocket wheel when the wear-cover is positioned thereon as shown in FIGURES 7 and 8 of the drawings. Obviously, as many lockpins as desired may be provided on the cover plate and, preferably, as many are provided as is required for each tooth of the sprocket wheel.

In cover plate 38, numeral 42 denotes sockets oriented for co-operation with lockpins 40. Interlocking of the pins and sockets is found to strengthen and rigidify the assembly although such is not considered to be essential and, if desired, the pins may simply extend for the width of the teeth.

With the unitary cover in place upon the sprocket wheel, the renewed sprocket wheel is placed in position upon the shaft and forced firmly against the cover plate 36. As will now be understood, the lockpins then seat themselves in the grooves between the teeth of the sprocket wheel and cover plate 38 is positioned as in FIGURE 8, thus positively preventing all movement of the unitary cover with respect to the sprocket wheel.

This form of the invention as indicated previously herein provides a trouble-free, danger-free assembly and possibly may be regarded as the most desirable embodiment of the invention because of the ease and rapidity with which it may be applied. As will be appreciated, a worn unitary cover is very easily removed by reversing the procedure of assembly, the unitary cover coming off as one piece.

Additionally, the sprocket wheel needs grooving at only one point and, as a matter of fact, if desired, the illustrated grooving may be omitted if a locking pin is supplied instead; however, the groove construction is preferred for reasons indicated at other points in this specification.

While the invention herein has been described with respect to particular embodiments, those skilled in the art will appreciate that various modifications within the scope of the invention may be derived from the teachings herein. Accordingly, this invention is not to be restricted unduly and is to be understood to extend to all modifications which flow from the teachings herein.

This application is a continuation in part of my prior application, Serial No. 90,597, filed January 18, 1961, now abandoned.

What is claimed is:

A preformed sprocket wheel having a plurality of teeth thereon, a series of slots between each of said teeth, said slots being in the bases of said teeth and extending inwardly thereof at an angle of at least about 45°, and wear covers for each of said teeth positioned upon the surface of said teeth, and having extended flanged portions mating with said slots, said wear covers abutting each other substantially along a portion thereof adjacent said flanged portions.

References Cited in the file of this patent

UNITED STATES PATENTS

| | | |
|---|---|---|
| 170,049 | Brooks | Nov. 16, 1875 |
| 905,756 | Skinner | Dec. 1, 1908 |
| 2,062,627 | Whitehead | Dec. 1, 1936 |
| 2,179,967 | Thompson | Nov. 14, 1939 |
| 3,059,491 | Hoff et al. | Oct. 23, 1962 |